(12) United States Patent
Kelch

(10) Patent No.: US 6,245,990 B1
(45) Date of Patent: Jun. 12, 2001

(54) GAS-INSULATED PIPELINE SYSTEM WITH AN INNER LINE SUPPORTED BY COLUMN-TYPE SUPPORT STRUCTURES

(75) Inventor: Thomas Kelch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/424,490

(22) PCT Filed: May 28, 1998

(86) PCT No.: PCT/DE98/01522

§ 371 Date: Nov. 23, 1999

§ 102(e) Date: Nov. 23, 1999

(87) PCT Pub. No.: WO98/54808

PCT Pub. Date: Dec. 3, 1998

(30) Foreign Application Priority Data

May 29, 1997 (DE) ............................................... 197 22 897
May 7, 1998 (DE) ............................................... 197 22 126

(51) Int. Cl.⁷ ........................................................ H02G 5/06
(52) U.S. Cl. ............................................ 174/28; 174/99 B
(58) Field of Search ................................. 174/28, 21 C, 174/99 R, 25 G, 24, 99 B; 333/244

(56) References Cited

U.S. PATENT DOCUMENTS

| | | | |
|---|---|---|---|
| 2,589,328 | * 3/1952 | Bondon | 333/244 |
| 2,939,903 | * 6/1960 | Lapsley et al. | 174/28 |
| 3,373,242 | * 3/1968 | Sewell | 174/21 C |
| 4,414,424 | * 11/1983 | Mizoguchi et al. | 174/28 |
| 4,417,094 | * 11/1983 | Spencer | 174/28 |
| 6,087,590 | * 7/2000 | Meinherz et al. | 174/99 R |

FOREIGN PATENT DOCUMENTS

| | | |
|---|---|---|
| 23 60 070 | 6/1975 | (DE) . |
| 195 15 308 | 5/1996 | (DE) . |
| 44 44 554 | 6/1996 | (DE) . |
| 852 037 | 1/1940 | (FR) . |
| 2 581 484 | 11/1986 | (FR) . |

* cited by examiner

Primary Examiner—Dean A. Reichard
Assistant Examiner—Chau N. Nguyen
(74) Attorney, Agent, or Firm—Kenyon & Kenyon

(57) ABSTRACT

A gas-insulated tubular conductor arrangement is provided in which, in order to simplify the manufacture, transport and handling of the inner conductor, the support regions of the tubular inner conductor formed with the aid of columnar supports, are modified in that the inner conductor is formed, in the support region, by a short tubular intermediate piece manufactured by casting. The short tubular intermediate piece is connected at its ends with the adjoining inner conductor segments is fashioned in one piece with a respective blind-hole-type sleeve that surrounds one end of a columnar support.

6 Claims, 4 Drawing Sheets

GAS-INSULATED PIPELINE SYSTEM WITH AN INNER LINE SUPPORTED BY COLUMN-TYPE SUPPORT STRUCTURES

BACKGROUND INFORMATION

1. Field of the Invention

The present invention relates to the field of gas-insulated tubular conductor arrangements as used for energy transmission, and is to be applied in the construction of those support regions, provided for the tubular inner conductor, in which insulating columnar supports are used as support elements.

2. Background Information

In a coventional tubular conductor arrangement such as that described in German Patent No. 44 44 554, a metallic sleeve is provided for the fixing of each columnar support to the tubular inner conductor; This sleeve surrounds the one end of the columnar support and at least partially penetrates a bored hole in the inner conductor. This sleeve can be fashioned as a blind hole, and can be provided with a rim fashioned as a field-control electrode. Using columnar supports of this type, a positioning of the tubular inner conductor above the midaxis of the encapsulating tube can be ensured in an easy-to-assemble manner (German Patent 195 15 308 C1). On the other hand, such a design of the support region requires a special mechanical processing (boring) of the inner conductor, which leads to a mechanical weakening of the conductor cross-section in the support plane.

SUMMARY

The present invention provides subject to as few limiting boundary conditions as possible in its manufacturing, transportation and assembly.

For the solution of this problem, it is proposed according to the present invention that, in the support region, the inner conductor is formed by a tubular intermediate piece manufactured by casting whose length is approximately twice its diameter and that is connected at its ends with the adjoining segments of the tubular inner conductor, and in that the blind-hole-type metallic sleeve is fashioned in one piece with the intermediate piece.

Given such a design of the support region, the individual segments of the tubular inner conductor can be manufactured without additional mechanical processing, and can be delivered to the construction site independent of the position and number of support regions in the tubular conductor arrangement. At the same time, the risk is minimized that the laterally bored tubular inner conductor can collapse due to transport or storing. The placing of the individual conductor parts into the casing of the tubular conductor arrangement is subject to fewer limiting boundary conditions, since tubular conductor segments of different lengths can be combined, so that for example shorter conductor pieces can also be processed. Due to the construction of the support region with the aid of a cast part, there result advantageous space relations, and thus additional constructive possibilities, so that the cast part, provided as a connecting piece, can be optimized dielectrically and mechanically. In this way, for example the possibility arises, given two or three columnar supports used in a support region, to push these supports together more tightly axially, or even to place them in one plane. When the columnar supports are pushed together tightly axially, the inner casting geometry also stabilizes the intermediate piece as a whole. Through the use of a cast intermediate piece, tolerance problems inside the support plane are also reduced; In addition, the integration of the sleeve into the intermediate piece offers a high degree of security against slivers (chips) that can be present in the inner conductor as a result of the processing of the ends of the parts of the inner conductor for connection purposes, and that could fall out later.

During the insertion of the new intermediate piece into the curve of the tubular inner conductor, it is useful to proceed in such a way that first the intermediate piece is connected with the two adjacent segments of the inner conductor either frictionally, materially, or in form-locked fashion, and that subsequently the columnar support or supports are placed into the intermediate piece. The connection of the intermediate piece with the subsequent segment of the inner conductor can be a shrink fit, a welded connection or a pressure-laminated connection, a plugged connection or a screwed connection, using a screw terminal or using axially overlapping end segments.

Given intermediate pieces in which the columnar supports have a certain axial spacing from one another, for mechanical stabilization it can be useful for the blind-hole-type sleeve-shaped region of the intermediate piece to be supported on the tubular region using a stiffening rib.

With the aid of the intermediate piece, the construction of the tubular conductor arrangement as a whole can also be taken into account, in that the intermediate piece has and after for example one or two radial openings through which the inner space of the inner conductor can be evacuated or can be filled with a gas mixture. With regard to the monitoring of the arrangement as a whole, the intermediate piece can also be used to house sensors, surface wave filters for measuring pressure and temperature. Sensors of this sort can be placed into the intermediate piece before the connection of the intermediate piece with the subsequent conductor segments, or through small cast openings. In addition, longitudinal or transverse slots that act as antennae can be installed.

In addition, the tubular intermediate piece can be used to strengthen the tubular conductor arrangement with regard to short-circuit loads. If the inner conductor is provided with only two supports, short-circuit forces could cause a radial displacement of the inner conductor. This can be prevented by arranging in the tubular intermediate piece one or two inserts that are made of aluminum or high-grade steel and that significantly increase the mass of the intermediate piece.

DETAILED DESCRIPTION

Figure 1:
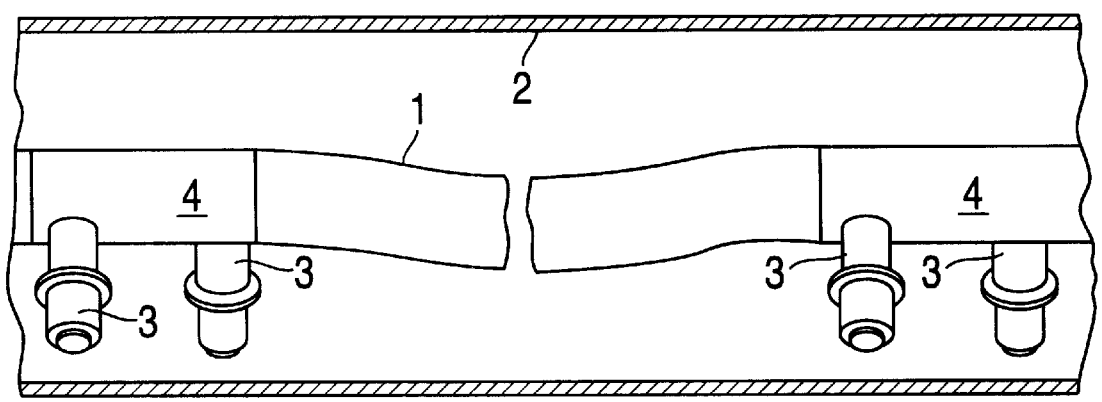
FIG. 1 shows a view of the design of a longitudinal segment of a tubular conductor arrangement having two support regions.
Figure 2:
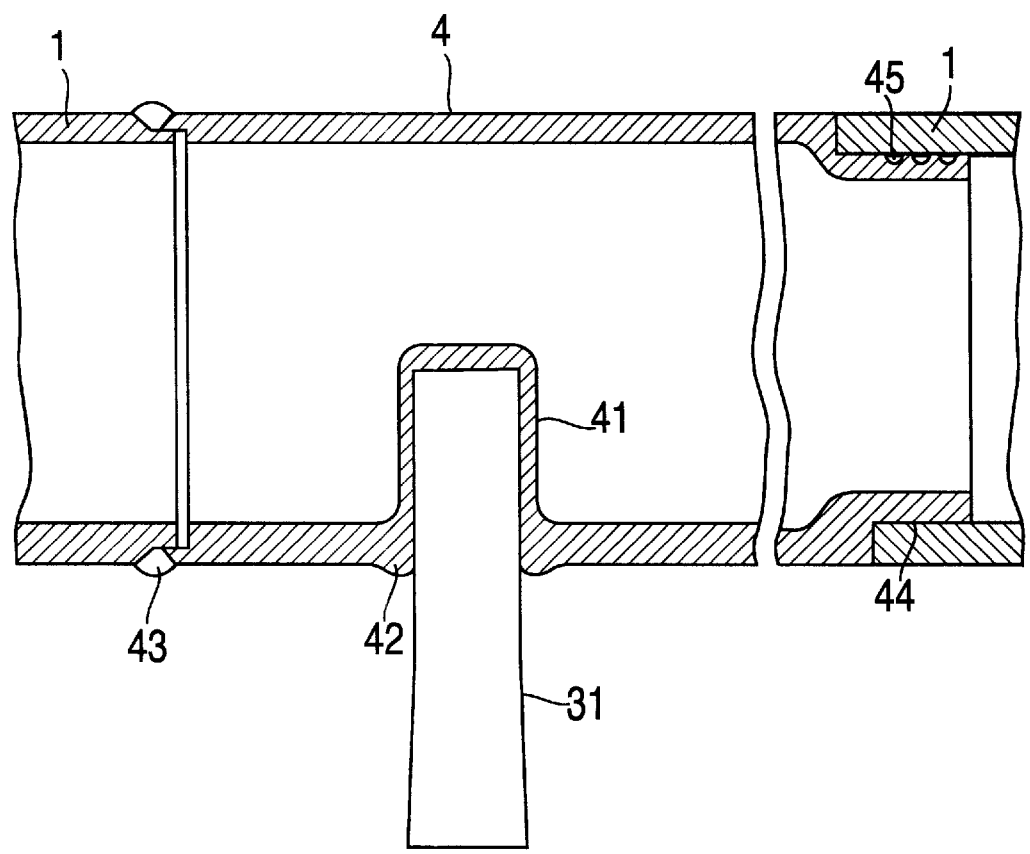
FIG. 2 shows an intermediate piece in longitudinal section, in connection with two adjoining inner conductor segments according to the present invention.

Following FIG. 2 of German Patent No. 195 15 308, FIG. 1 shows a longitudinal segment of a gas-insulated tubular conductor arrangement, in which a tubular inner conductor 1 is arranged in an casing 2, and is supported against this casing with the aid of insulating support elements 3 in the form of columnar supports. Here two columnar supports 3 are provided at larger intervals, these supports being arranged in offset fashion to one another both in the axial direction and also in the circumferential direction of inner conductor 1. In addition, FIG. 1 shows that special intermediate pieces 4 are inserted in the course of tubular inner conductor 1. Support elements 3 engage with these intermediate pieces, and the intermediate pieces are connected with the subsequent segments of the inner conductor.

FIG. 2 shows such a intermediate piece 4, which is connected with two adjoining inner conductor segments 1 at its two ends, via either a welded connection 43 or a shrink fit 44 or a pressure-laminated connection 45. Intermediate piece 4 is a cast part, for example made of aluminum, into which a blind-hole-type sleeve 41 is integrated for the acceptance of the one end of a columnar support 31. This sleeve 41 is located in the interior space of intermediate piece 4, and at the perimeter of the intermediate piece it goes over into the cylindrical part of intermediate piece 4 via a rim 42 that acts as a field control electrode.

Figure 3:
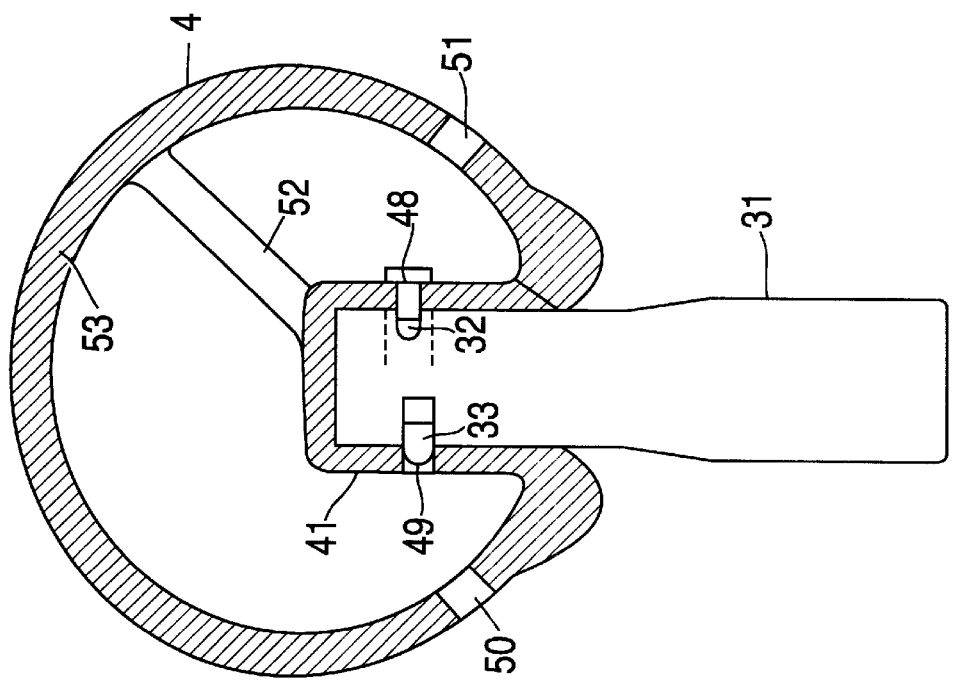
FIG. 3 shows an intermediate piece in cross-section, with a first variant for the axial fixing of the columnar support in the intermediate piece.

As shown in FIG. 3, for the fixing of columnar support 31 in sleeve 41, a peg 46 fixed in the wall of sleeve 41 can be provided that engages in a bayonet slot 47 of columnar support 31.

Figure 4:
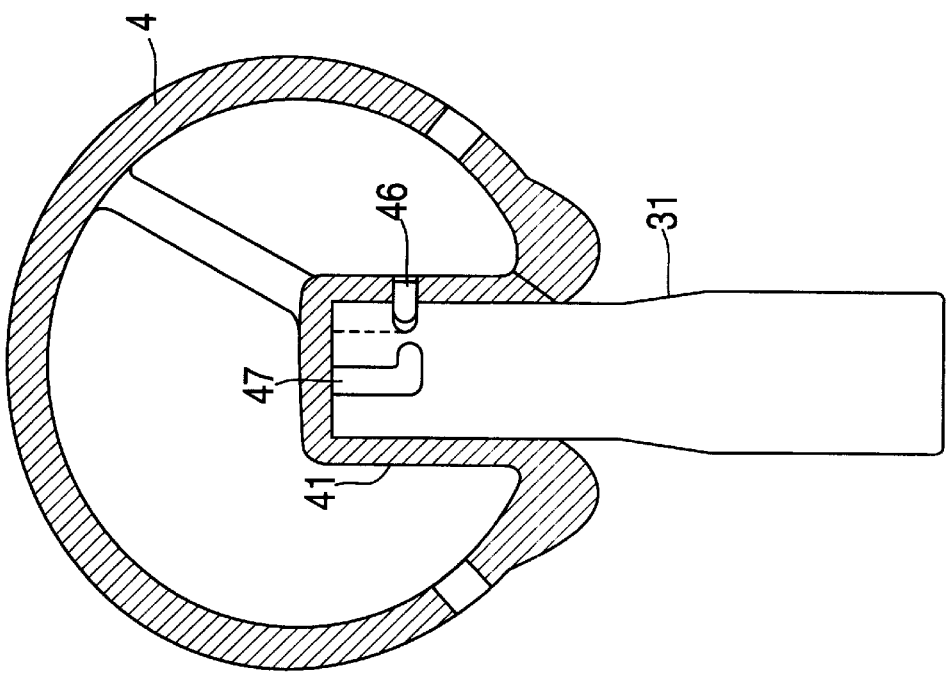
FIG. 4 shows a intermediate piece in cross-section, with a second and third variant for the axial fixing of a columnar support.

As shown in FIG. 4, for the fixing of columnar support 31 in blind-hole-type sleeve 41, a clasp 48 provided with a peg can be provided, whose peg engages in a bored hole 32 of the columnar support. Alternatively, a spring-loaded peg 33, which snaps into a lateral transverse bored hole 49 of sleeve 41, can also be provided in columnar support 31.

As shown in FIG. 4, in the wall of the intermediate piece a bored hole 50 can be provided for the purpose of evacuation and/or for filling with a gas mixture, or a longitudinal or transverse slot 51 can also be provided for the insertion of antennae, or a stiffening rib 52, via which sleeve 41 is supported on tubular region 53 of intermediate piece 4, can also be provided.

Figure 5:
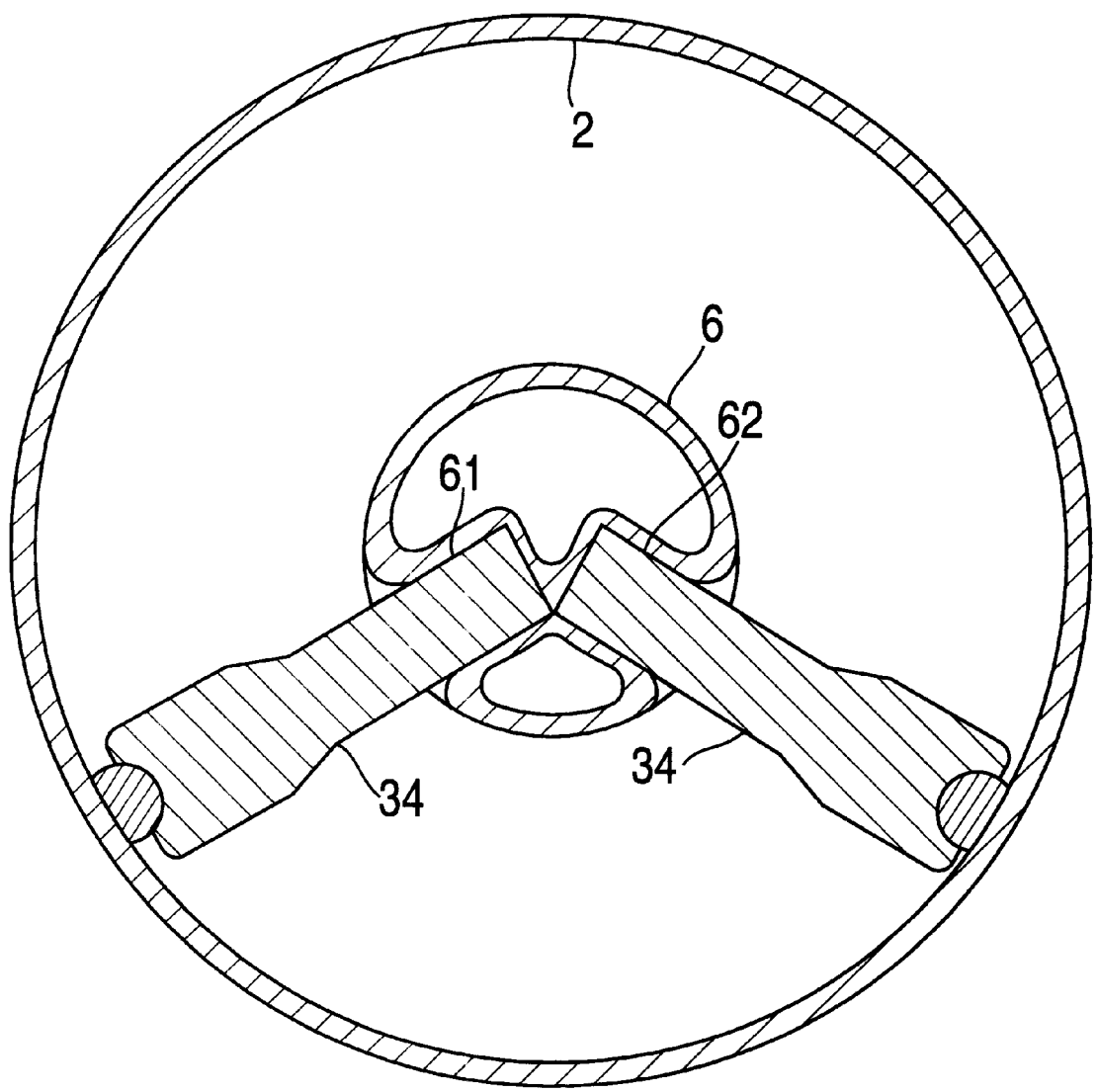
FIG. 5 hows a cross-sectional representation of a intermediate piece for two columnar supports, in relation to the surrounding casing.

The arrangement of columnar supports 31, provided according to FIGS. 2 to 4, can also be provided two or three times on intermediate piece 4, so as to be offset to one another in the circumferential and axial directions. As shown in FIG. 5, two columnar supports 34 can also be arranged in the same plane of supports. In this context, the design of sleeves 61 and 62 can be selected such that the formation of a field-controlling rim is superfluous. This also holds for the exemplary embodiments according to FIGS. 2 to 4.

Through the use of intermediate pieces fashioned as cast parts, the allocation of columnar supports and intermediate piece via the metallic sleeves can also take place in such a way that the midaxis of the columnar supports does not cross the axis of the tubular inner conductor; that is, the columnar supports do not have to be arranged radially to the inner conductor.

Figure 6:
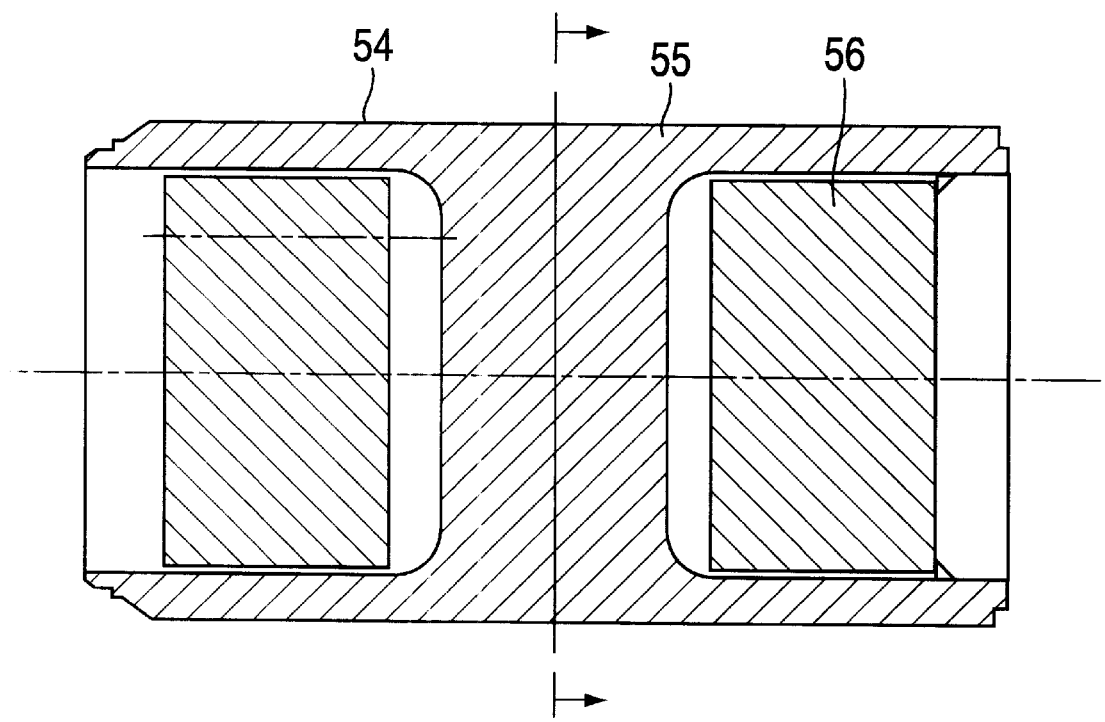
FIGS. 6 and 7 how an intermediate piece in longitudinal and cross-section, having blind holes arranged in a relatively broad stiffening rib, and having additional weights.

As shown in FIG. 6, tubular intermediate piece 54 is provided with a relatively broad stiffening rib 55 that is centrically arranged. An additional weight 56, made of semi-finished aluminum or high-grade steel, can be arranged in each of the two hollow spaces that remain to the left and to the right of stiffening rib 55, and can be fixed there by screwing or welding.

Figure 7:
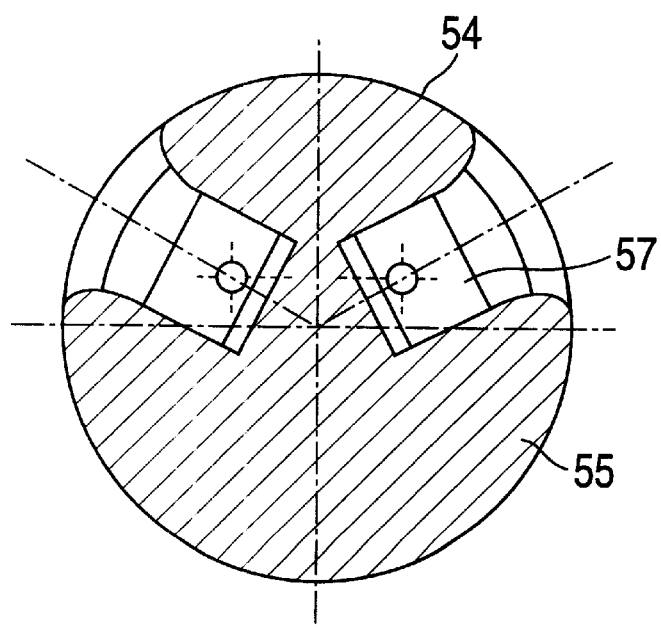

As shown in FIG. 7, stiffening rib 55 also contains two blind-hole-type recesses 57 that are used for the acceptance of columnar supports.

What is claimed is:

1. A gas-insulated tubular conductor arrangement, comprising:

an outer tubular casing;

an inner tubular conductor arranged in the outer tubular casing including a cast tubular intermediate piece, each end of the cast tubular intermediate piece being joined to a different respective segment of the inner tubular conductor adjacent to the end, the cast tubular intermediate piece including an integral blind-hole-type metallic sleeve formed in one piece with the cast tubular intermediate piece, a length of the cast tubular intermediate piece being twice a diameter of the cast tubular intermediate piece; and an insulating columnar support supporting the inner tubular conductor against the outer tubular casing, one end of the insulating columnar support extending into and being joined to the blind-hole-type metallic sleeve, the blind-hole-type metallic sleeve circumferentially surrounding the one end of the insulating columnar support.

2. The conductor arrangement according to claim 1, wherein the blind-hole-type metallic sleeve is supported on a tubular region of the cast tubular intermediate piece by a stiffening rib.

3. The conductor arrangement according to claim 1, wherein the cast tubular intermediate piece has at least one vent hole.

4. The conductor arrangement according to claim 1, wherein the cast tubular intermediate piece has a least one slot having a limited length, the at least slot arranged one of longitudinally with respect to the cast tubular intermediate piece and traversely with respect to the cast tubular intermediate piece.

5. The conductor arrangement according to claim 1, further comprising:

an insert arranged in the tubular intermediate piece, the insert being made of one of aluminum and high-grade steel and significantly increasing a mass of the tubular intermediate piece.

6. The conductor arrangement according to claim 1, wherein the inner tubular casing is configured for energy transmission in a high voltage range.

* * * * *